United States Patent [19]
Ohmamyuda et al.

[11] Patent Number: 5,502,432
[45] Date of Patent: Mar. 26, 1996

[54] APPARATUS AND METHOD OF WARNING REAR-END COLLISION

[75] Inventors: Yukio Ohmamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Yasushi Senoo, Yokohama, all of Japan

[73] Assignee: Stanley Electric Co., Ltd., Tokyo, Japan

[21] Appl. No.: 988,675

[22] Filed: Dec. 10, 1992

[30] Foreign Application Priority Data

Dec. 16, 1991 [JP] Japan ................. 3-351815

[51] Int. Cl.$^6$ ................................. B60Q 1/00
[52] U.S. Cl. ............. 340/436; 340/435; 340/901; 340/903; 180/271
[58] Field of Search ................. 340/435, 436, 340/901, 903; 180/271

[56] References Cited

U.S. PATENT DOCUMENTS

| | | | |
|---|---|---|---|
| 4,833,649 | 5/1989 | David | 340/901 |
| 4,934,477 | 6/1990 | Dai | 340/435 |
| 5,053,979 | 10/1991 | Etoh | 340/903 |
| 5,153,559 | 10/1992 | Atsumi | 340/903 |
| 5,166,881 | 11/1992 | Akasu | 340/903 |
| 5,189,619 | 2/1993 | Adachi et al. | 340/903 |

FOREIGN PATENT DOCUMENTS

0448756A1 10/1991 European Pat. Off. .

OTHER PUBLICATIONS

Funkschau, No. 6, 1975, Munchen De pp. 55–57, Bollhagen et al "Ein Infrarot–Auffahrschutzgerät füf Kraftfahrzeuge".

*Primary Examiner*—John K. Peng
*Assistant Examiner*—Edward Lefkowitz
*Attorney, Agent, or Firm*—Frishauf, Holtz, Goodman & Woodward

[57] ABSTRACT

A warning apparatus for warning of possible rear-end collision of a given vehicle having the warning apparatus with another vehicle preceding the given vehicle includes: a computer; a distance sensor for measuring a vehicle-to-vehicle distance to the another preceding vehicle; and a velocity sensor for measuring the velocity of the given vehicle. The computer computes a relative velocity of the given and the another preceding vehicle from a differential of the vehicle-to-vehicle distance and then computes an anticipated rear-end collision time by dividing of the vehicle-to-vehicle distance by the relative velocity of the given vehicle. The computer corrects the anticipated rear-end collision time in response to an acceleration and the relative velocity. The computer produces a warning of signal and an alarm is provided in response to the corrected anticipated rear-end collision time. A method of warning of a possible rear-end collision comprises the step of: detecting a vehicle-to-vehicle distance between a given vehicle and the another vehicle preceding the given vehicle; detecting a velocity of the given vehicle; computing an anticipated rear-end collision time $T_a$ of the given vehicle with the another vehicle, with an equation:

$$T_a = \frac{X - T_k \times V_m}{\frac{T_a \times G}{2} + V_r}$$

and producing a warning in response to the computed anticipated rear-end collision time $T_a$.

10 Claims, 1 Drawing Sheet

APPARATUS AND METHOD OF WARNING REAR-END COLLISION

BACKGROUND OF THE INVENTION

The present invention relates to an apparatus and a method for warning of a rear-end collision of an automotive vehicle by measuring a distance between the present vehicle and a preceding vehicle, computing the then state (e.g. a velocity) of the present vehicle and warning when anticipating a possible rear-end collision of the present vehicle against the preceding vehicle.

DESCRIPTION OF THE PRIOR ART

A block diagram of an electronic circuit of a prior art rear-end collision warning apparatus is identical to FIG. 1 showing a block diagram of an electronic circuit of a rear-end collision warning apparatus according to a first embodiment of the present invention. However, additional information is developed in the technique of the present invention, and operation of the elements is therefore different. The prior art rear-end collision warning apparatus comprises a distance sensor 92, a central processing unit (CPU) 91 comprising, e.g., a microprocessor, a vehicle velocity sensor 93, and a display or alarm 94. The CPU receives distance signal X of a vehicle-to-vehicle distance between the present vehicle and the preceding vehicle from the distance sensor 92 and a velocity signal $V_m$ of the present vehicle from the vehicle velocity sensor 93 and produces a warning signal $W_s$ on the alarm 94. The alarm 94 warns of a possible rear-end collision to a driver of the present vehicle, e.g., with a voice alarm.

The CPU compares velocity signals $V_m$ with distance signals X and produces warning signals $W_s$ when the velocity signal $V_m$ indicates 100 km/h and the distance signal X indicates 100 m or lower, when the velocity signal $V_m$ indicates 80 km/h and the distance signal X indicates 80 m or lower and when the velocity signal $V_m$ indicates 60 km/h and the distance signal X indicates 60 m or lower.

The prior art rear-end collision warning apparatus measures only the vehicle-to-vehicle distance for the preceding vehicle but no state e.g. velocity of the preceding vehicle. Therefore, the prior art rear-end collision warning apparatus must determine a criterion for producing warning signals $W_s$ in view of the estimated worst case, e.g., a case where the preceding vehicle is in a standing position. It follows then that the prior art rear-end collision warning apparatus must produce warning signal $W_s$ in response to a predetermined vehicle-to-vehicle distance, e.g., even if the preceding vehicle is moving faster than the present vehicle to increase the vehicle-to-vehicle distance with time and no rear-end collision of the present vehicle is normally expected to take place. This causes a driver of the present vehicle to have a clear feeling of physical disorder. On the other hand, when a case, e.g., a case where the preceding vehicle moves backwards, worse than the estimated worst case takes place, the prior art rear-end collision warning apparatus produces warning signal $W_m$ too late, which is insufficient and potentially dangerous.

SUMMARY OF THE INVENTION

An object of the present invention is to provide an apparatus and a method for warning of a rear-end collision of an automotive vehicle always in time. In order to achieve the object, an apparatus for warning of a possible rear-end collision of a vehicle having the apparatus for warning or the possible rear-end collision against a preceding vehicle according to a first embodiment of the present invention comprises a computer, a distance sensor measuring a vehicle-to-vehicle distance between the present vehicle and the preceding vehicle and sending a distance signal to the computer, a velocity sensor sensing a velocity of the present vehicle and sending a velocity signal to the computer, an alarm means receiving a warning signal from the computer, the computer computing an anticipated rear-end collision time by the equation:

$$Ta = \frac{X - Tk \times Vm}{\frac{Ta \times G}{2} + Vr},$$

where $T_a$ represents an anticipated rear-end collision time in seconds, X represents a vehicle-to-vehicle distance between the present vehicle and the preceding vehicle in meters, $T_k$ represent a buffer time in seconds, $V_m$ represent a velocity of the present vehicle in m/s (meters per second), $V_r$ represent a relative velocity in m/s (meters per second), and G represent an acceleration on relative velocity $V_r$, the computer sends the warning signal to the alarm means and the alarm means provides a warning in response to the computed anticipated rear-end collision time.

An apparatus for warning of a possible rear-end collision of a vehicle having the apparatus for warning of a possible rear-end collision against a preceding vehicle according to a second embodiment of the present invention comprises a computer, a distance sensor measuring a vehicle-to-vehicle distance between the present vehicle and the preceding vehicle and sending a distance signal to the computer, a velocity sensor sensing a velocity of the present vehicle and sending a velocity signal to the computer, a braking sensor sensing a state of a brake of the present vehicle and sending a braking signal to the computer, an acceleration sensor sensing a degree of opening of an accelerator of the present vehicle and sending an acceleration signal to the computer, an alarm receiving a warning signal from the computer, the computer computing an anticipated rear-end collision time by the equation:

$$Ta = \frac{X - Tk \times Vm}{\frac{\alpha \times Ta \times G}{2} + Vr},$$

where $T_a$ is an anticipated rear-end collision time in seconds, X is a vehicle-to-vehicle distance between the present vehicle and the preceding vehicle in meters, $T_k$ is a buffer time in seconds, $V_m$ is velocity of the present vehicle in m/s, $\alpha$ is a state parameter of the present vehicle, $V_r$ is relative velocity in m/s, and G is an acceleration on relative velocity $V_r$, the computer sending the warning signal to the alarm, the computer changing the value of the parameter $\alpha$ in response to the braking signal and the acceleration signal, and the alarm warning in response to the computed anticipated rear-end collision time.

A method for warning of a possible rear-end collision comprises the steps of detecting a vehicle-to-vehicle distance between a vehicle and a preceding vehicle, detecting a velocity of the present vehicle, computing an anticipated rear-end collision time by the equation:

$$Ta = \frac{X - Tk \times Vm}{\frac{Ta \times G}{2} + Vr},$$

where $T_a$ is an anticipated rear-end collision time in seconds, X is a vehicle-to-vehicle distance between the present vehicle and the preceding vehicle in meters, $T_k$ is a buffer time in seconds, $V_m$ is a velocity of the present vehicle in m/s, $V_r$ is a relative velocity in m/s and, G represent an acceleration on relative velocity $V_r$, and warning in response to the computed anticipated rear-end collision time.

A method for warning of a possible rear-end collision comprises the steps of detecting a vehicle-to-vehicle distance between a vehicle and a preceding vehicle, detecting a velocity of the present vehicle, detecting a state of a brake of the present vehicle, detecting a degree of opening of an accelerator of the present invention, computing an anticipated rear-end collision time by the equation:

$$Ta = \frac{X - Tk \times Vm}{\frac{\alpha \times Ta \times G}{2} + Vr},$$

where $T_a$ is an anticipated rear-end collision time in seconds, X is a vehicle-to-vehicle distance between the present vehicle and the preceding vehicle in meters, $T_k$ is a buffer time in seconds, $V_m$ is a velocity of the present vehicle in m/s, $\alpha$ is a state parameter of the present vehicle, $V_r$ is a relative velocity in m/s and, G signs acceleration on relative velocity $V_r$, the parameter $\alpha$ depends on the state of the brake and the degree of opening of the accelerator, and is used to provide a warning in response to the computed anticipated rear-end collision time.

In the present invention, the apparatus does not warn of a rear-end collision when the preceding vehicle is moving faster than the present vehicle even if the vehicle-to-vehicle distance between the present vehicle and the preceding vehicle has reached a predetermined value at which time apparatus is to warn of a rear-end collision. On the other hand, the apparatus can warn a possible rear-end collision long before the vehicle-to-vehicle distance has reached of a predetermined value at which the apparatus is to warn the rear-end collision, when the preceding vehicle moves backwards. Thus, the of the present invention apparatus can always appropriately warn of a possible collision in response to the actual relationship between the present vehicle and the preceding vehicle.

In addition, the apparatus of the present invention can serially produce warning which vary from a case of safety to a case of danger in accordance with the degrees of dangerousness so as to clearly indicate the degree of dangerousness to the driver of the present vehicle.

DETAILED DESCRIPTION

Figure 1:
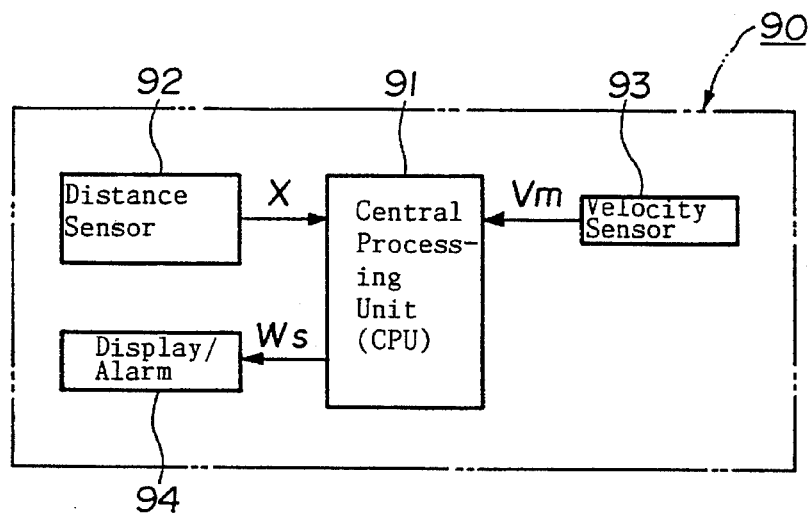
FIG. 1 is a block diagram of an electronic circuit of a rear-end collision warning apparatus according to a first embodiment of the present invention.

Embodiments of the present invention will be described with reference to the drawings hereinafter. A block diagram of an electronic circuit of a rear-end collision warning apparatus 90 of FIG. 1 according to a first embodiment of the present invention is identical to that of the prior art rear-end collision warning apparatus as described above but functions differently and develops additional information. The rear-end collision warning apparatus 90 comprises a distance sensor 92, a central processing unit (CPU) 91 comprising, e.g., a microprocessor, a vehicle velocity sensor 93, and a display or alarm 94.

Unlike the CPU of the prior art rear-end collision warning apparatus, the CPU 91 of the present invention computes the relative velocity $V_r$ of the preceding and present vehicles, the acceleration G due to a change of relative velocity $V_r$, and a then anticipated rear-end collision time $T_a$ (i.e. a period of time from the present time to a time of an anticipated rear-end collision) from computed relative velocity $V_r$, by the equation (1):

$$Ta = \frac{X - Tk \times Vm}{\frac{Ta \times G}{2} + Vr}, \qquad (1)$$

where $T_a$ is the anticipated rear-end collision time in seconds, X is the vehicle-to-vehicle distance between the present vehicle and the preceding vehicle in meters, $T_k$ is the buffer time in seconds, $V_m$ is the velocity of the present vehicle in m/s, $V_r$ is the relative velocity in m/s and, G represent the acceleration on relative velocity $V_r$. The CPU 91 then produces a warning signal $W_s$ from a computed anticipated rear-end collision time $T_a$.

The computation of the anticipated rear-end collision time $T_a$ by the CPU 91 will be described hereinafter.

In principle, the anticipated rear-end collision time $T_a$ equals $X/V_r$. For example, when vehicle-to-vehicle distance X equals 100 m and relative velocity $V_r$ equals 5 m/s (i.e. the present vehicle approaches a preceding vehicle at a velocity of 5 m/s), anticipated rear-end collision time $T_a$ equals 20 seconds (=100 m/5 m/s). The CPU 91 computes the relative velocity $V_r$ from distance signals X of the distance sensor 92. For example, when the distance sensor 92 measures vehicle-to-vehicle distance X every sampling time $T_s$ of 100 seconds, and the last measured vehicle-to-vehicle distance $X_1$ equals 100.5 m, and the present measured vehicle-to-vehicle distance $X_2$ equals 100 m, relative velocity $V_r$ equals 5 m/s (=(100.5 m−100 m)/0.1 s).

In the first embodiment of the present invention, the computation of the anticipated rear-end collision time $T_a$ employs the factors of a buffer time $T_k$ and an acceleration G due to the change of relative velocity $V_r$ in order to produce finer estimates of an anticipated rear-end collision time $T_a$.

Buffer time $T_k$ is defined as a period of time during which the driver of the present vehicle views a danger and then brakes. If velocity $V_m$ of the present vehicle is 100 km/h (i.e. approximately 30 m/s) and buffer time $T_k$ equals 0.5 s, the present vehicle will run 15 m unbraked until the driver of the present vehicle starts braking. In the present invention, buffer time $T_k$ is given as a constant to the present vehicle and velocity $V_m$ of the present vehicle times buffer time $T_k$ produces an unbraked run distance of the present vehicle. The unbraked run distance is substracted from the vehicle-to-vehicle distance X (see the above equation (1)) to produce an actual braked vehicle-to-vehicle distance.

When the unbraked run distance is more than the vehicle-to-vehicle distance X, i.e., the value $(X-T_a \times V_m)$ is negative, this means that the present vehicle is approaching the preceding vehicle so that the driver of the present vehicle has no actual buffer time $T_k$. The CPU 91 immediately produces a warning signal $W_s$ on the display 94.

Acceleration G matches a variation of relative velocity $V_r$ due to, e.g., the braking of the present vehicle. The employment of acceleration G in the equation (1) always gives accurate anticipated rear-end collision time $T_a$ immediately after relative velocity $V_r$ has changed, to increase the accuracy of the rear-end collision warning apparatus 90. Therefore, the CPU 91 can produce real warning signals $W_s$, cutting a momentary fluctuation in relative velocity $V_r$.

Acceleration G is defined as a differential of relative velocity $V_r$ and is actually determined by the equation (2):

$$G = \frac{Vr1 - Vr2}{Ts}, \quad (2)$$

wherein $V_{r1}$ is the present computed relative velocity, $V_{r2}$ is the last computed relative velocity and $T_s$ is a sampling period of time. When vehicle-to-vehicle distance X decreases, acceleration G is positive. On the other hand, when vehicle-to-vehicle distance X increases, acceleration G is negative.

Acceleration G times anticipated rear-end collision time $T_a$ gives a variation of the relative velocity $V_r$ due to acceleration G for determined the anticipated rear-end collision time $T_a$. Half of acceleration G, times anticipated rear-end collision time T, gives an average velocity of the present vehicle for determining anticipated rear-end collision time $T_a$. Therefore, an addition of the half of the acceleration G times the anticipated rear-end collision time $T_a$ to relative velocity $V_r$ (see the above equation (1)) causes the anticipated rear-end collision time $T_a$ to factor in of the change of relative velocity $V_r$ immediately after the relative velocity $V_r$ has changed. Thus, the rear-end collision warning providing by the present invention increases the accuracy in the anticipation of a rear end collision. Anticipated rear-end collision time $T_a$ is constant as long as acceleration G is constant. The rear-end collision warning apparatus 90 can preclude an unstable condition that the anticipated rear-end collision time $T_a$ changes every time relative velocity $V_r$ has changed.

In operation, the apparatus according to the first embodiment of the present invention first computes the anticipated rear-end collision time $T_a$ by the equation (3):

$$Ta = \frac{X}{Vr} \quad (3)$$

and corrects the anticipated rear-end collision time $T_a$ by use of acceleration G on relative velocity $V_r$ to produce warning signal $W_s$ corresponding to an actual relationship between the present vehicle and the preceding vehicle.

Thus, anticipated rear-end collision time $T_a$ constituting warning signal $W_s$ from the CPU 91 can provide a series of: a 20-second before warning, a 19-second before warning, an 18-second before warning—so that the apparatus can serially warn by degrees of the sensed danger.

Figure 2:
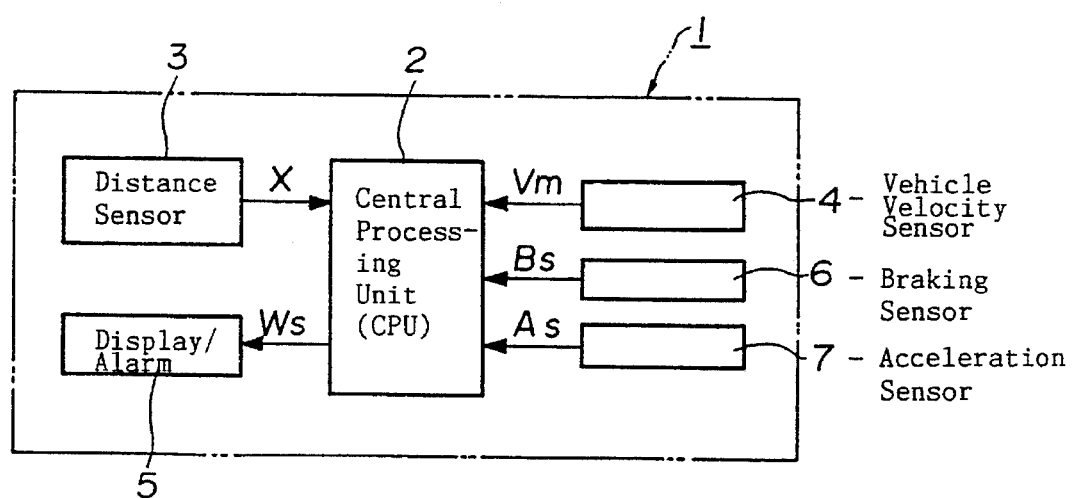
FIG. 2 is a block diagram of an electronic circuit of a rear-end collision warning apparatus according to a second embodiment of the present invention.

As shown in FIG. 2, a rear-end collision warning apparatus 1 according to a second embodiment of the present invention comprises a central processing unit (CPU) 2, a distance sensor 3 measuring a vehicle-to-vehicle distance between the present vehicle and the preceding vehicle and sending vehicle-to-vehicle distance signal X to the CPU 2, a vehicle velocity sensor 4 concurrently sending velocity signal $V_m$ of the present vehicle to the CPU 2, a display or alarm 5 receiving warning signal $W_s$ from the CPU 2 for warning a driver of the present vehicle, a braking sensor 6 sending braking signal $B_s$ of a brake to the CPU 2, and an acceleration sensor 7 sending acceleration signal $A_s$ of an accelerator to the CPU 2.

The rear-end collision warning apparatus 1 employs a braking and an acceleration of the driver of the present vehicle as additional factors for a finer computation of anticipated rear-end collision time $T_a$ than the embodiment of FIG. 1. These additional factors serve to finely correct anticipated rear-end collision time $T_a$ according to the first embodiment of the present invention.

The CPU 2 computes relative velocity $V_r$ of the present and preceding vehicles, acceleration G, and then anticipated rear-end collision time $T_a$ from the computed relative velocity $V_r$ by the equation (4):

$$Ta = \frac{X - Tk \times Vm}{\frac{\alpha \times Ta \times G}{2} + Vr} \quad (4)$$

the value of the parameter a depends on a state of a brake of the present vehicle and a degree of opening of an accelerator of the present vehicle. When the braking sensor 6 produces no braking signal and the acceleration sensor 7 produces no acceleration signal, the value of a equals 1. The CPU 2 produces warning signal $W_s$ from computed anticipated rear-end collision time $T_a$.

The CPU 2 produces a first acceleration G by the equation (1) when $\alpha$ is 1. It is easily anticipated that the present vehicle will be accelerated at a second acceleration G greater than the first acceleration G when acceleration signal $A_s$ indicates a degree of opening of an accelerator larger than a predetermined value. Thus, the CPU 2 computes ($\alpha \times G$) by the equation (4) to produce anticipated rear-end collision time $T_a$ shorter than that produced by the equation (1), where $\alpha > 1$. On the other hand, when the CPU 2 has received braking signal $B_s$, the CPU 2 selects the parameter $\alpha$ to be a corresponding value and computes ($\alpha \times G$) by the equation (4) to produce anticipated rear-end collision time $T_a$ longer than that produced by the equation (1), where $\alpha < 1$.

The present invention is not rigidly restricted to the embodiments described above. A person skilled in the art can easily change and modify the present invention without departing from the spirit of the invention defined in the appended claims.

What is claimed is:

1. A warning apparatus for warning of a possible rear-end collision of a given vehicle having the warning apparatus with another vehicle preceding the given vehicle, comprising:

a computer;

a distance means for determining a vehicle-to-vehicle distance between the given vehicle and the another vehicle and for sending a distance signal to said computer;

a velocity means for determining a velocity of the given vehicle and for sending a velocity signal to said computer;

alarm means for receiving a warning signal provided by said computer;

said computer computing an anticipated rear-end collision time $T_a$ of the given vehicle with the another vehicle with an equation:

$$T_a = \frac{X - T_k \times V_m}{\frac{T_a \times G}{2} + V_r},$$

where $T_a$ is an anticipated rear-end collision time as measured in seconds, X is a vehicle-to-vehicle distance between the given vehicle and the another vehicle measured in meters, $T_k$ is a buffer time measured in seconds, $V_m$ is a velocity of the given vehicle measured in m/s (meters per second), $V_r$ is a relative velocity measured in m/s (meters per second), and G is an acceleration on relative velocity $V_r$;

said computer sending said warning signal to said alarm means; and said alarm means providing a warning in response to the computed anticipated rear-end collision time $T_a$.

2. A warning apparatus for warning of a possible rear-end collision of a given vehicle, having the warning apparatus with another vehicle, preceding the given vehicle comprising:

a computer;

a distance means for determining a vehicle-to-vehicle distance between the given vehicle and the another vehicle and for sending a distance signal to said computer;

a velocity means for determining a velocity of the given vehicle and for sending a velocity signal to said computer;

a braking means for determining a state of a brake of the given vehicle and for sending a braking signal to said computer;

an acceleration means for determining a degree of opening of an accelerator of the given vehicle and for sending an acceleration signal to said computer;

alarm means for receiving a warning signal from said computer;

said computer computing an anticipated rear-end collision time $T_a$ of the given vehicle with the another vehicle with an equation:

$$T_a = \frac{X - T_k \times V_m}{\frac{\alpha \times T_a \times G}{2} + V_r},$$

where $T_a$ is an anticipated rear-end collision time measured in seconds, X is a vehicle-to-vehicle distance between the given vehicle and the another vehicle measured in meters, $T_k$ is a buffer time measured in seconds, $V_m$ is a velocity of the given vehicle measured in m/s (meters per second), $\alpha$ is a present state parameter of the given vehicle, $V_r$ is a relative velocity measured in m/s (meters per second), and G is an acceleration on relative velocity $V_r$;

said computer sending said warning signal to said alarm means, said computer changing a value of the parameter $\alpha$ in response to a braking signal of the given vehicle and an acceleration signal of the given vehicle; and said alarm means providing a warning in response to the computed anticipated rear-end collision time $T_a$.

3. A method for warning of a possible rear-end collision between two vehicles, comprising the steps of:

determining a vehicle-to-vehicle distance between a given vehicle and another vehicle preceding said given vehicle;

determining a velocity of said given vehicle;

computing an anticipated rear-end collision time $T_a$ of said given vehicle with said another vehicle with an equation:

$$T_a = \frac{X - T_k \times V_m}{\frac{T_a \times G}{2} + V_r},$$

where $T_a$ is an anticipated rear-end collision time measured in seconds, X is vehicle-to-vehicle distance between given vehicle and said another vehicle measured in meters, $T_k$ is a buffer time measured in seconds, $V_m$ is a velocity of the given vehicle measured in m/s (meters per second), $V_r$ is relative velocity measured in m/s (meters per second) and, G is an acceleration on relative velocity $V_r$; and producing a warning in response to said computed anticipated rear-end collision time $T_a$.

4. A method for warning of a possible rear-end collision between two vehicles, comprising the steps of:

determining a vehicle-to-vehicle distance between a given vehicle and another vehicle preceding said given vehicle;

determining a velocity of said given vehicle;

determining a state of a brake of said given vehicle;

determining a degree of opening of an accelerator of said given vehicle;

computing an anticipated rear-end collision time $T_a$ between said given and said another vehicle with an equation:

$$T_a = \frac{X - T_k \times V_m}{\frac{\alpha \times T_a \times G}{2} + V_r},$$

where $T_a$ is an anticipated rear-end collision time as measured in seconds, X is a vehicle-to-vehicle distance between said given vehicle and said another vehicle measured in meters, $T_k$ is a buffer time measured in seconds, $V_m$ is a velocity of the given vehicle in m/s (meters per second), $\alpha$ is a present state parameter of the given vehicle, $V_r$ is a relative velocity in m/s (meters per second) and, G is an acceleration on relative velocity $V_r$, the value of said parameter $\alpha$ depending on a present state of the brake of said given vehicle and a degree of opening of an accelerator of said given vehicle; and providing a warning in response to the computed anticipated rear-end collision time $T_a$.

5. A method for warning of a potentially impending rear-end collision between a given vehicle and another vehicle preceding and spaced apart from said given vehicle, comprising the steps of:

determining a vehicle-to-vehicle distance between said given and said another vehicle;

determining a present velocity of said given vehicle;

calculating a relative velocity of said given vehicle relative to said another vehicle;

computing an anticipated rear-end collision time between said given vehicle and said another vehicle, if said calculated relative velocity of said given vehicle to said another vehicle will decrease said distance therebetween; and providing a warning in response to said computed anticipated rear-end collision time.

6. The method of claim 5, wherein said determining a vehicle-to-vehicle distance step comprises monitoring said vehicle-to-vehicle distance as said distance between said given vehicle and said another vehicle decreases.

7. The method of claim 5, further comprising:

ascertaining a decrease in said distance between said given vehicle and said another vehicle;

said ascertaining step including adjusting a determination that said distance is decreasing, based upon:

a present state of a braking means of said given vehicle; and a present state of an accelerator of said given vehicle.

8. A warning apparatus for warning of a potentially impending rear-end collision between a given vehicle and another vehicle preceding and spaced apart from said given vehicle comprising:

means for determining a vehicle-to-vehicle distance between said given and said another vehicle;

means for determining a present velocity of said given vehicle;

calculating means for calculating a relative velocity of said given vehicle relative to said another vehicle;

computing means for computing an anticipated rear-end collision time between said given vehicle and said another vehicle, if said calculated relative velocity of said given vehicle and said another vehicle is decreasing said distance therebetween; and warning means for providing a warning in response to the computed anticipated rear-end collision time.

9. The warning apparatus of claim 8, wherein the means for determining a vehicle-to-vehicle distance comprises means for monitoring said vehicle-to-vehicle distance between said given vehicle and said another vehicle.

10. The warning apparatus of claim 8, further comprising:

ascertaining means for ascertaining a decrease in said distance between said given vehicle and said another vehicle;

said ascertaining means including means for adjusting a determination that said distance is decreasing, based upon a present state of a braking means of said given vehicle and a present state of an accelerator of said given vehicle.

* * * * *